United States Patent
Yasuhara et al.

[11] Patent Number: 6,037,566
[45] Date of Patent: Mar. 14, 2000

[54] ARC WELDING APPARATUS FOR CONSTANT CURRENT AND VOLTAGE CHARACTERISTICS COST AND WEIGHT OF WHICH BEING REDUCED

[75] Inventors: Yoshimichi Yasuhara, Ibaraki; Masafumi Naruto, Osaka; Masayuki Okubo, Takatsuki, all of Japan

[73] Assignee: Matsushita Electric Industrial Co., Ltd., Osaku-fu, Japan

[21] Appl. No.: 09/115,673

[22] Filed: Jul. 15, 1998

[30] Foreign Application Priority Data

Jul. 16, 1997 [JP] Japan ..................... 9-190835

[51] Int. Cl.$^7$ ........................................ B23K 9/10
[52] U.S. Cl. ........................................... 219/130.1
[58] Field of Search ..................... 219/130.1, 130.33, 219/137 PS

[56] References Cited

U.S. PATENT DOCUMENTS

| | | | |
|---|---|---|---|
| 2,447,955 | 8/1948 | MillHolland et al. | 219/130.1 |
| 2,464,679 | 3/1949 | Fletcher et al. | 219/130.1 |
| 4,398,080 | 8/1983 | Johansson et al. | 219/130.1 |

FOREIGN PATENT DOCUMENTS 427300  11/1947  Italy ..................... 219/130.1

*Primary Examiner*—Clifford C. Shaw
*Attorney, Agent, or Firm*—Greenblum & Bernstein, P.L.C.

[57] ABSTRACT

An arc welding apparatus having output terminals of a constant current characteristic and a constant voltage characteristic is simply provided at low cost with a reactor appropriate for both the characteristics. A current control circuit 2 controls a secondary output current of a welding transformer 1 by means of a current control device, while a first reactor 3 and a second reactor 4 are constructed so that magnetic flux formed by a first winding 3a and magnetic flux formed by a second winding 4a, which are wound around an annular iron core 7, overlap each other. The other terminal of the first reactor 3 is connected to a constant current characteristic output terminal 8, while the other terminal of the second reactor 4 is connected to a welding base metal use output terminal 10. A constant voltage characteristic output terminal 9 and one terminal of the first reactor 3 are connected to the positive side of the current control circuit 2, while one terminal of the second reactor 4 is connected to the negative side of the current control circuit 2.

12 Claims, 2 Drawing Sheets

CONSTANT CURRENT
CHARACTERISTIC

CONSTANT VOLTAGE
CHARACTERISTIC

ARC WELDING APPARATUS FOR CONSTANT CURRENT AND VOLTAGE CHARACTERISTICS COST AND WEIGHT OF WHICH BEING REDUCED

BACKGROUND OF THE INVENTION

The present invention relates to an arc welding apparatus that solely has a constant current characteristic output means and a constant voltage characteristic output means.

A prior art arc welding apparatus construction is shown in FIG. 2.

In FIG. 2 are shown a transformer 1 for welding, a current control circuit 2 for controlling the secondary side output of the welding transformer 1 by means of a current control device, a holder 5 for manual welding, a welding rod 6 for manual welding, a constant current characteristic output terminal 8, a constant voltage characteristic output terminal 9, an output terminal 10 for welding base metal, a torch 11 for a $CO_2$ arc welding apparatus, a base material 12 for welding, a constant current characteristic coil 13 and a constant voltage characteristic coil 14. The constant current characteristic coil 13 and the constant voltage characteristic coil 14 have been wound around separate iron cores 13a and 14a, respectively, as shown in FIG. 2.

This prior art arc welding apparatus operates to control an output voltage from the welding transformer 1 by means of the current control circuit 2 and supply an output from the current control circuit 2 to the constant current characteristic output terminal 8 via the coil 13 and to the coil 14 via the constant voltage characteristic output terminal 9.

This prior art enables manual welding by connecting the manual welding holder 5 to the constant current characteristic output terminal 8 and enables $CO_2$ arc welding by connecting the $CO_2$ arc welding apparatus torch 11 to the constant voltage characteristic output terminal 9. The prior art is constructed so that the coil 14 operates when performing $CO_2$ arc welding and the coil 13 operates when performing manual welding.

FIG. 3A shows a constant current characteristic of a power source for use in securing constant depth of penetration into the base metal while maintaining a welding current constant regardless of a change in arc length according to a welding method such as manual welding and TIG (Tungsten Inert Gas arc) welding, which cannot automatically adjust the arc length. Assuming now that the arc length is L1 as shown in the figure in the case of, for example, manual welding, the operating point is located at S1 in FIG. 3A that shows a relation between a welding current and a welding voltage. In this case, when the arc length extends to L2 due to hand movement or the like, the arc voltage increases, consequently moving the operating point from S1 to S2. However, with the power source of the constant current characteristic of FIG. 3A, the welding current scarcely varies in accordance with the shift of the operating point to S2, and therefore, welding can be continued while securing the constant depth of penetration into the base metal. If a power source of a constant voltage characteristic as shown in FIG. 3B is used, then the welding current sharply decreases in accordance with the shift of the operating point to S2, so that not only the securing of constant depth of penetration but also the continuation of welding become difficult.

On the other hand, according to $CO_2$ arc welding and MIG (Metal Inert Gas arc) welding by which a welding wire is automatically fed, a power source of the constant voltage characteristic shown in FIG. 3B is used so as to continue satisfactory welding by keeping the welding voltage, i.e., the arc length approximately constant regardless of a variation in welding current. If now a welding wire feed speed is slowed down to extend the arc length from L1 to L2, then the arc voltage increases to shift the operating point from S1 to S2. However, since the welding current sharply decreases in accordance with this shift as shown in the figure, the quantity of fusion of the welding wire reduces to automatically compensate for the reduction in feed speed for the restoration of the arc length to the original length L1, so that satisfactory welding can be continued. If a power source of the constant current characteristic shown in FIG. 3A is used, then the welding current scarcely varies even when the operating point shifts to S2. Therefore, the quantity of fusion of the welding wire does not reduce, as a consequence of which the reduction in feed speed cannot be compensated and arc disappears, resulting in disabled welding.

Generally, in $CO_2$ arc welding, importance is attached to the stability of arc in a short-circuiting transfer region, and therefore, the quantity of inductance of a coil appropriate for $CO_2$ arc welding must be made smaller than the quantity of inductance of manual welding. Furthermore, the quantity of inductance of the coil must be made as large as possible in manual welding in order to secure the stability of arc.

Therefore, in the prior art, the cross-sectional area of an iron core 13a of the constant current characteristic coil 13 is made greater than the cross-sectional area of an iron core 14a of the constant voltage characteristic coil 14, and the number of turns of the coil 13 of the constant current characteristic coil 13 is also made greater than the number of turns of the coil 14 of the constant voltage characteristic coil 14. As described above, in the prior art, two types of coils having different inductance values have been provided for different welding methods and they are connected across the output terminal 8 and the terminal 10 and across the terminal 9 and terminal 10, respectively.

However, since the magnitude of the inductance of the constant current characteristic coil 13 appropriate for manual welding is different from the magnitude of the inductance of the constant voltage characteristic coil appropriate for $CO_2$ arc welding in the prior art arc welding apparatus, the constant current characteristic coil 13 for manual welding and the constant voltage characteristic coil 14 for $CO_2$ arc welding have been wound around the separate iron cores 13a and 14a, respectively. Furthermore, the constant current characteristic coil 13 has been connected to the constant current characteristic output terminal 8, while the constant voltage characteristic coil 14 has been connected to the constant voltage characteristic output terminal 9. The above arrangement has led to the problem that the amount of use of iron core as well as the amount of use of coil are increased to cause an increase in manufacturing cost, an increase in weight of the arc welding apparatus and so on.

SUMMARY OF THE INVENTION

The present invention has an object to solve the aforementioned conventional problems.

In order to achieve this object, two coils wound around an identical annular iron core are used as a first coil and a second coil, whereby the first coil is connected to a constant current characteristic output means and the second coil is connected to a base metal for welding.

With this arrangement, no current flows through the first coil when performing $CO_2$ arc welding, and a welding current flows through only the second coil connected to the base metal for welding. When performing manual welding, a welding current flows through both the second coil connected to the base metal for welding and the first coil connected to the constant current characteristic output means, where magnetic flux formed by these two coils takes effect in an overlapping manner.

According to the present invention, the following excellent effects can be produced. That is, the amount of use of iron of the iron core material for the first and second coils and the amount of use of aluminum or copper serving as a coil material are allowed to be small, so that the direct material cost of the arc welding apparatus can be remarkably reduced. Furthermore, the circuit construction is simplified, and this facilitates the assembling to allow the reduction in number of processes necessary for manufacturing the arc welding apparatus and allows the reduction in amount of use of iron and the reduction in amount of use of aluminum or copper of the first and second coils. Therefore, the total weight of the arc welding apparatus can be reduced, so that work with physical movement is facilitated in the case of performing welding work with physical movement, consequently lightening the burden on the welder.

DETAILED DESCRIPTION OF THE PREFERRED EMBODIMENTS

An arc welding apparatus according to an embodiment of the present invention will be described in detail below with reference to FIG. 1.

Figure 1:
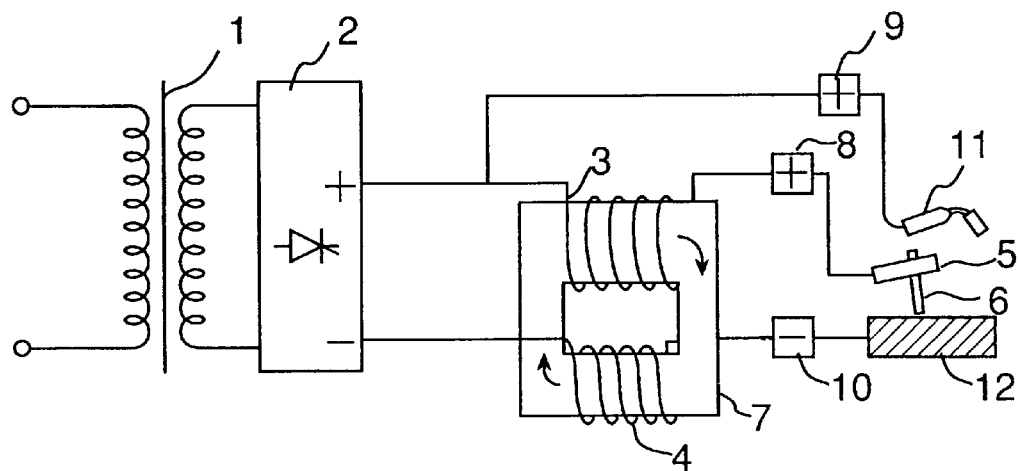
FIG. 1 is a block diagram of an arc welding apparatus according to an embodiment of the present invention.
Figure 2:
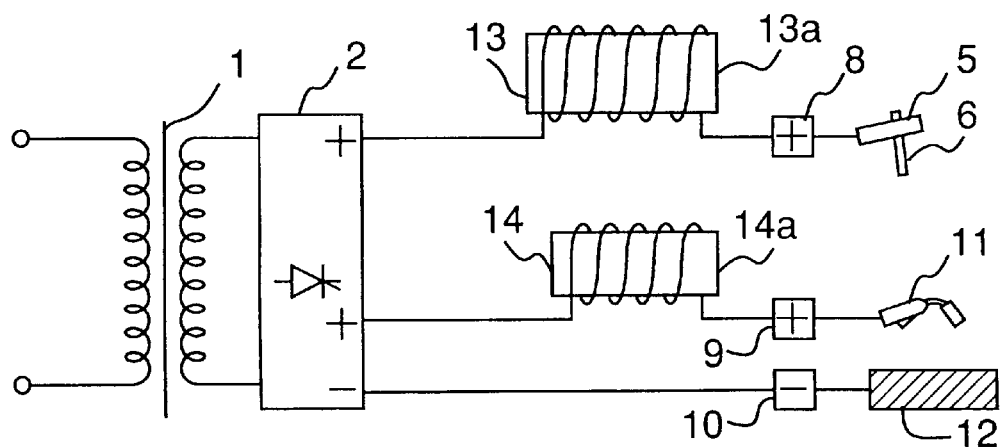
FIG. 2 is a block diagram of a prior art arc welding apparatus.
Figure 3A:
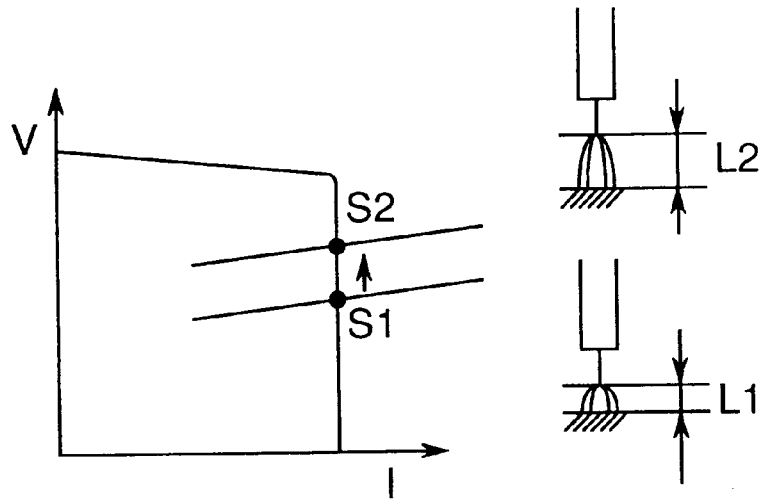
FIG. 3A is a graph showing a constant current characteristic.
Figure 3B:
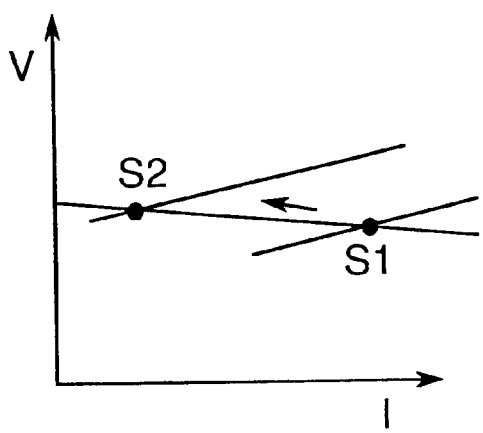
FIG. 3B is a graph showing a constant voltage characteristic.

In FIG. 1, the components 1, 2, 5, 6, 8, 11 and 12 are the same as those of the prior art, and therefore, no description is provided for them. The reference numerals 8 and 9 denote a constant current characteristic output terminal and a constant voltage characteristic output terminal, serving as a constant current characteristic output means and a constant voltage characteristic output means, respectively. The reference numerals 3 and 4 denote a first coil and a second coil wound around an identical annular iron core 7, where one terminal of the first coil 3 and one terminal of the second coil 4 are connected to the positive output side and to the negative output side of the current control circuit 2, respectively, and the other terminals of them are connected to the constant current characteristic output terminal 8 and the welding base metal use output terminal 10, respectively.

That is, the first coil 3 is connected between the positive side of the current control circuit 2 and the constant current characteristic output terminal 8, while the second coil 4 is connected between the negative side of the current control circuit 2 and the welding base metal use output terminal 10.

The present embodiment has two major features as follows. The first feature is that the positive side of the current control circuit 2 is connected to the constant current characteristic output terminal 8 via the first coil 3 and directly to the constant voltage characteristic output terminal 9 and the welding base metal use output terminal 10 is connected to the negative side via the second coil 4.

By thus connecting the first coil 3 and the second coil 4, only the second coil 4 connected to the welding base metal use output terminal 10 becomes effective in the case of $CO_2$ arc welding, and both the first coil 3 and the second coil 4 operate in the case of manual welding. With this arrangement, a large quantity of inductance can be obtained with smaller quantities of use of iron core and coil than those of the prior art, and a coil having a small quantity of inductance for $CO_2$ arc welding can be achieved.

The second feature is that the magnetic flux formed by the first coil 3 and the second coil 4 is directed in an identical direction and arranged in an overlapping manner in the annular iron core 7. Therefore, an identical welding current flows through the first coil 3 connected to the constant current characteristic output terminal 8 and the second coil 4 connected to the welding base material 12 when performing manual welding, and the magnetic flux formed by this current is directed in an identical direction. With this connection, the first and second coils 3 and 4 are connected in series with each other in the case of manual welding, totally increasing the number of turns of coil, so that the total quantity of inductance of the first and second coils 3 and 4 becomes a great value as compared with the quantity of inductance provided solely by the second coil 4 for $CO_2$ arc welding.

The number of turns of the second coil 4 is set to a value appropriate for $CO_2$ arc welding. The number of turns obtained by adding the number of turns of the first coil 3 to the number of turns of the second coil 4 is set to a value appropriate for performing manual welding. When performing manual welding, the first coil 3 and the second coil 4 are electrically connected in series with each other, when the magnetic flux formed by the first and second coils is directed in the identical direction and arranged in an overlapping manner, consequently achieving a coil having a large inductance capacity. The welding current flows through only the second coil 4 when performing $CO_2$ arc welding, and therefore, a small inductance capacity appropriate for $CO_2$ arc welding is achieved.

The first coil 3 and the second coil 4 are wound around the identical annular iron core 7, and therefore, quantities of inductance appropriate for the respective welding methods can be formed with a small amount of material.

Although the present embodiment employs the constant current characteristic output terminal and the constant voltage characteristic output terminal as the constant current characteristic output means and the constant voltage characteristic output means, respectively, they can also be achieved by providing a switch between the outputs without using the terminals. The present embodiment employs the holder for manual welding and the welding rod for manual welding as tools to be connected to the constant current characteristic output means and employs the torch for the $CO_2$ arc welding apparatus as tools to be connected to the constant voltage characteristic output means. However, it is acceptable to employ a torch for TIG welding (Tungsten Inert Gas Arc Welding) and a non-consumable electrode as tools to be connected to the constant current characteristic output means and employ a torch for MIG welding (Metal Inert Gas Arc Welding) and MAG welding (Metal Argon Gas Arc Welding) as tools to be connected to the constant voltage characteristic output means.

What is claimed is:

1. An arc welding apparatus which has a constant current characteristic output for manual welding and a constant voltage characteristic output for $CO_2$ welding and includes a welding transformer and a current control circuit for controlling a secondary output current of the welding transformer, the current control circuit being connected to one terminal of a first coil and one terminal of a second coil, the other terminal of the first coil being connected to the constant current characteristic output, the other terminal of the second coil being connected to a welding base metal output, the constant voltage characteristic output connected to a junction of the current control circuit and the first coil, and the first coil and the second coil being wound around an annular iron core so that magnetic flux formed by the coils is directed in a same direction.

2. The arc welding apparatus as claimed in claim 1, wherein the constant current characteristic output for manual welding comprises one of a welding system terminal for manually performed shielded metal arc welding and TIG welding.

3. The arc welding apparatus as claimed in claim 1, wherein the constant voltage characteristic output for $CO_2$ comprises a welding system terminal for one of $CO_2$ welding, MIG welding and MAG welding.

4. An arc welding apparatus which has a constant current characteristic output means, a constant voltage characteristic output means, a welding base metal output means, and a current control circuit, and in which coils are wound around an annular iron core so that magnetic flux formed by a first coil and a second coil, that are connected to the constant current characteristic output means and the welding base metal output means respectively, is directed in a same direction, the current control circuit enabling selective switching between an output having a constant current characteristic through the first and second coils and the constant current characteristic output means and an output having a constant voltage characteristic through the second coil and the constant voltage characteristic output means.

5. An arc welding apparatus as claimed in claim 4, wherein the constant current characteristic output means comprises a welding system terminal for shielded metal arc welding to be manually performed.

6. An arc welding apparatus as claimed in claim 4, wherein the constant current characteristic output means comprises a welding system terminal for TIG welding.

7. An arc welding apparatus as claimed in claim 4, wherein the constant voltage characteristic output means comprises a welding system terminal for one of $CO_2$ welding, MIG welding and MAG welding.

8. The arc welding apparatus claimed in claim 7, a first output of said current control circuit being directly coupled to the constant voltage characteristic output and to the constant current characteristic output through the first coil, a second output of said current control circuit being connected to the welding base metal output through the second coil.

9. An arc welding apparatus which has a constant current characteristic output, a constant voltage characteristic output and a welding base metal output, and a current control circuit, and in which coils are wound around an annular iron core so that magnetic flux formed by a first coil and a second coil that are connected to the constant current characteristic output and the welding base metal output respectively is directed in a same direction, the current control circuit enabling selective switching between an output having a constant current characteristic through the first and second coils and the constant current characteristic output and an output having a constant voltage characteristic through the second coil and the constant voltage characteristic output.

10. The arc welding apparatus as claimed in claim 9, wherein the constant current characteristic output comprises a welding system terminal for manually performed shielded metal arc welding.

11. The arc welding apparatus as claimed in claim 9, wherein the constant current characteristic output comprises a welding system terminal for TIG welding.

12. The arc welding apparatus as claimed in claim 9, wherein the constant voltage characteristic output comprises a welding system terminal for one $CO_2$ welding, MIG welding and MAG welding.

* * * * *